March 23, 1926.
L. G. DESES ET AL
REEL
Filed Oct. 6, 1925
1,578,231
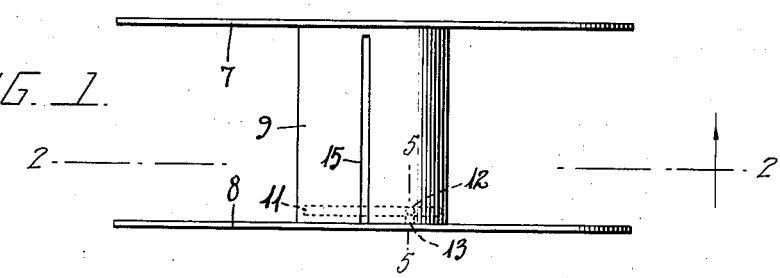
FIG. 1.
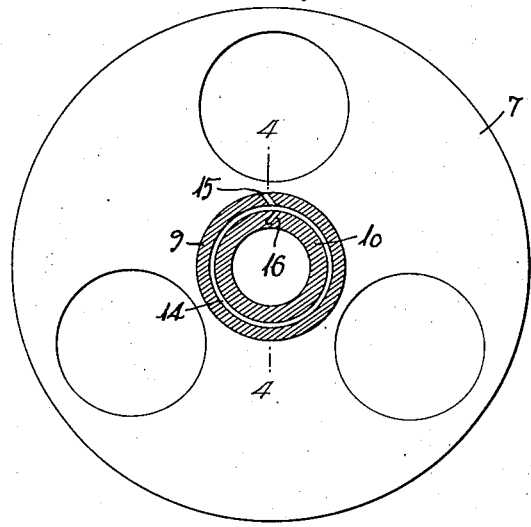
FIG. 2.
FIG. 3.
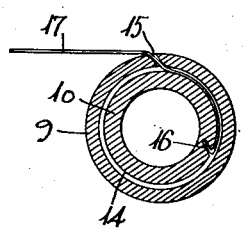
FIG. 4.
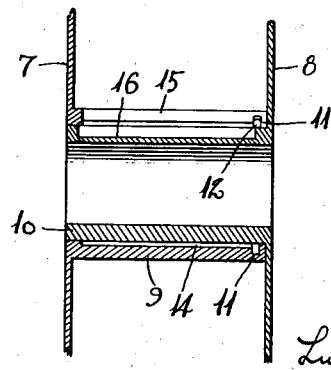
FIG. 5.
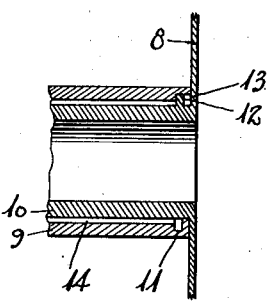
Inventors:
Luis Gomez Deses
Antonio de Mendoza
By Monroe E. Miller
Attorney.

Patented Mar. 23, 1926.

1,578,231

UNITED STATES PATENT OFFICE.

LOUIS GOMEZ DESES AND ANTONIO DE MENDOZA, OF MEXICO, MEXICO, ASSIGNORS TO CAMEX DISPLAYS CORPORATION, OF NEW YORK, N. Y., A CORPORATION OF NEVADA.

REEL.

Application filed October 6, 1925. Serial No. 60,924.

*To all whom it may concern:*

Be it known that we, LOUIS GOMEZ DESES, a citizen of Mexico, and ANTONIO DE MENDOZA, a citizen of Colombia, both residing at Mexico, D. F., Mexico, have invented certain new and useful Improvements in Reels, of which the following is a specification.

The present invention relates to reels, spools, drums and similar devices for winding up strips, tapes, webbing, motion picture films, and the like, and aims to provide a reel or spool having novel means for fastening the strip or other flexible element thereon or thereto.

Another object of the invention is the provision of a reel or spool having a smooth and unobstructed hub on which the strip or flexible element may be wound without injury, and means within the hub portion for effectively securing the strip or flexible element thereto.

A further object is the provision of a spool or reel comprising side sections or members detachably connected in a novel manner, to permit the side plates or sections to be conveniently separated.

It is also an object of the invention to provide a reel or spool of the kind indicated which is extremely simple in construction and economical to manufacture, and which will be thoroughly practical and efficient in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is an elevation of the reel or spool embodying the improvements.

Fig. 2 is a section thereof on the line 2—2 of Fig. 1.

Fig. 3 is a cross section of the hub corresponding with Fig. 2 and showing the hub members or sections rotated relatively to one another to secure the strip or flexible element between them.

Fig. 4 is a diametrical section on the line 4—4 of Fig. 2.

Fig. 5 is a diametrical section on the line 5—5 of Fig. 1.

The reel or spool is composed of two sections or members having the side plates, disks or flanges 7 and 8 to which are secured in any suitable manner the hub sections or members 9 and 10, respectively. Said hub members are tubular and of different diameters to slip or telescope together with the inner hub member 10 adapted to fit or be secured on a shaft, spindle or other member to carry or mount the reel or spool in any well known manner.

The two sections of the reel are detachably connected, and in order to prevent separation of the sections, the hub members 9 and 10 have interengaging portions. Thus, the hub member 9 is provided adjacent to that end opposite to the side plate 7 with an internal annular groove 11, and the inner hub member 10 has an outstanding lug or pin 12 adjacent to the side plate 8 to enter the groove 11 and hold the hub members assembled. An entrance notch or slot 13 extends from the groove 11 to the end of the hub member 9 to permit of the passage of the lug 12 when the hub members are turned relatively to one another to bring said lug and notch into registration. This enables the reel sections to be readily moved axially relatively to one another for assembling or separating the sections. When the lug 12 is moved through the notch 13 into the groove 11, the reel sections may be turned to remove the lug 12 from the notch 13 thereby preventing separation of the reel sections until they are rotated to bring the lug 12 into alinement with the notch 13.

The telescoping hub sections or members 9 and 10 not only provide for the separation of the reel sections but also provide for securing the strip or flexible element to the reel. Thus, a space or clearance 14 is provided between the hub members, which is exaggerated in the drawings, and this space or clearance may be slight. The outer hub member 9 has a slot 15 extending therethrough from its outer to its inner periphery, and preferably extending longitudinally to the end of the member 9 opposite to the side plate 7, as seen in Figs. 1 and 4. The inner hub member 10 has a slot or groove 16 at its outer periphery. The slots 15 and 16 are arranged obliquely or are inclined in opposite directions, as seen in Fig. 2, and said slots register when the reel sections are turned to a predetermined position relatively to one another, preferably when the lug 12 is in registration with or located within the notch 13. Thus, when the hub members have been moved together the slots 15 and 16 are in registration to receive the end of the strip or flexible member 17. By inserting the end of the strip or flexible element through the slot 15 it enters the slot 16 forming an angular hook to engage in the slot 16. Then, by turning the reel sections relatively to one another in the proper direction the end of the strip or flexible element is carried in between the hub members 9 and 10, as seen in Fig. 3, and this relative rotation of the reel sections is continued until the strip or element 17 binds between the hub members. This may require only a partial relative rotation of the hub members 9 and 10 or may require a complete revolution or more. By reversing the relative rotation of the reel sections the strip or element 17 is moved outwardly through the slot 15 until the strip or element can be withdrawn from the hub members in detaching the strip from the reel. It will be noted that the outer periphery of the hub, as well as the side plates or flanges 7 and 8 are smooth and unencumbered in order that the strip or flexible element may be wound upon and unwound from the reel without injury, and there are no parts that are apt to become detached or lost. The reel being composed of only two parts or sections is simple in construction, and may be manufactured economically. The reel may be of different sizes for many different purposes, such as for motion picture films, typewriter and other inked ribbons or webs, perforated strips or sheets for automatic pianos and other musical instruments or machines, etc.

Having thus described the invention, what is claimed as new is:—

1. A reel having hub members adapted to telescope together and to rotate relatively to one another and to receive and grip a strip or flexible element between them, said members having portions adapted to interengage by relative rotation of said members to prevent longitudinal separation of said members until they are rotated reversely relatively to another.

2. A reel having hub members adapted to telescope together and to turn relatively to one another, the outer hub member having a slot for the passage of a strip or other flexible element between said members, the inner hub member being formed to receive said strip or element and to grip same between said members when they are rotated relatively to one another, and said members having portions adapted to interengage when said members are rotated relatively to one another as aforesaid to prevent longitudinal separation of said members until they are rotated reversely relatively to one another.

3. A reel having hub members adapted to telescope together and to rotate relatively to one another, the outer hub member having a slot for the passage of a strip or other flexible element, the inner hub member having a slot to receive the end of said strip or element, one of the hub members having an annular internal groove and a slot extending from said groove to one end of said hub member, and the other hub member having a lug to pass through the lastnamed slot in moving the hub members together or apart, and to move in said groove when the hub members are turned relatively to one another for holding them assembled.

4. A reel having hub members adapted to telescope together and to rotate relatively to one another, the outer hub member having a slot for the passage of a strip or other flexible element, the inner hub member having a slot to receive the end of said strip or element, one of the hub members having an annular internal groove and a slot extending from said groove to one end of said hub member, and the other hub member having a lug to pass through the lastnamed slot in moving the hub members together or apart, and to move in said groove when the hub members are turned relatively to one another for holding them assembled, said lug and lastnamed slot being so arranged with reference to the first and secondnamed slots as to register with one another when the first and second named slots are in registration.

In testimony whereof we hereunto affix our signatures.

LOUIS GOMEZ DESES.
ANTONIO DE MENDOZA.